United States Patent
Beau et al.

(10) Patent No.: US 8,376,596 B2
(45) Date of Patent: Feb. 19, 2013

(54) PIECE OF MOTOR VEHICLE INTERIOR EQUIPMENT AND ASSOCIATED METHOD OF MANUFACTURE

(75) Inventors: Godefroy Beau, La Garenne Colombes (FR); Jean-Francois Oeuvrard, Pontoise (FR)

(73) Assignee: Faurecia Interieur Industrie, Nanterre (FR)

( * ) Notice: Subject to any disclaimer, the term of this patent is extended or adjusted under 35 U.S.C. 154(b) by 183 days.

(21) Appl. No.: 12/936,577

(22) PCT Filed: Apr. 6, 2009

(86) PCT No.: PCT/FR2009/050580
§ 371 (c)(1),
(2), (4) Date: Oct. 6, 2010

(87) PCT Pub. No.: WO2009/136048
PCT Pub. Date: Nov. 12, 2009

(65) Prior Publication Data
US 2011/0032715 A1   Feb. 10, 2011

(30) Foreign Application Priority Data
Apr. 7, 2008 (FR) ...................................... 08 52303

(51) Int. Cl.
*B60Q 1/26* (2006.01)
(52) U.S. Cl. ........ 362/488; 362/459; 362/489; 29/897.2
(58) Field of Classification Search ................... 362/488, 362/489, 490, 492; 29/897.2
See application file for complete search history.

(56) References Cited

U.S. PATENT DOCUMENTS

| | | | | | |
|---|---|---|---|---|---|
| 4,411,467 | A | * | 10/1983 | Cziptschirsch et al. | 296/97.5 |
| 5,558,364 | A | * | 9/1996 | Davis | 362/488 |
| 6,464,381 | B2 | * | 10/2002 | Anderson et al. | 362/488 |
| 6,666,571 | B2 | * | 12/2003 | Becher et al. | 362/490 |
| 7,845,856 | B2 | * | 12/2010 | Shimizu et al. | 384/477 |
| 2001/0030871 | A1 | * | 10/2001 | Anderson et al. | 362/488 |
| 2003/0002273 | A1 | * | 1/2003 | Anderson et al. | 362/84 |
| 2011/0179902 | A1 | * | 7/2011 | Bostick | 74/558 |

FOREIGN PATENT DOCUMENTS

| | | |
|---|---|---|
| DE | 10 2005 036533 A1 | 2/2007 |
| FR | 2 824 510 A1 | 11/2002 |

OTHER PUBLICATIONS

International Search Report, dated Nov. 5, 2009, from corresponding PCT application.

\* cited by examiner

*Primary Examiner* — John A Ward
(74) *Attorney, Agent, or Firm* — Young & Thompson

(57) ABSTRACT

This piece includes a rigid support frame (12) and an external skin (14) of soft appearance. The skin (14) has an exterior surface (24) intended to be placed opposite an occupant of the motor vehicle. The piece includes a foam layer (16) inserted between the support frame (12) and the exterior skin (14) and an assembly (18) for displaying at least one light signal on the exterior surface (24) of the skin. The display assembly (18) includes a device (30) for illuminating, through the skin, from the interior surface (26) of the skin, a chosen region (48) of the exterior surface (24). The illuminating device (30) is flexible so that it deforms when touched. It is fastened on the interior surface (26) the skin. A region (40) of the foam layer (16) is inserted between the support frame (12) and the illuminating device (30).

15 Claims, 4 Drawing Sheets

PIECE OF MOTOR VEHICLE INTERIOR EQUIPMENT AND ASSOCIATED METHOD OF MANUFACTURE

The present invention concerns a piece of motor vehicle interior equipment, of the type comprising:
- a rigid support frame;
- an external skin of soft appearance, at least partially translucent, the external skin having an exterior surface intended to be placed facing an occupant of the motor vehicle, and an interior surface;
- a layer of foam inserted between the support frame and the external skin;
- an assembly for displaying at least one light signal on the exterior surface of the skin, the display assembly comprising at least one device for illuminating, through the skin, from the interior surface of the skin, a chosen region of the exterior surface of the skin.

Such a piece is intended for instance to form a motor vehicle dashboard or more generally an interior trim panel of said vehicle intended for example to adorn a door, ceiling, or floor of the vehicle.

Known from FR-A-2 824 510 is a piece of equipment of the aforementioned type, comprising a rigid support frame, a translucent soft external skin, and a layer of translucent foam, inserted between the support frame and the external skin. The part also comprises a display assembly including an illuminating device formed by bulbs and a mask defining a pictogram.

The illuminating assembly is placed inside the part to illuminate the exterior surface of the skin from the interior surface of the skin through the skin and the foam layer.

To make the skin agreeable to touch, it is nevertheless necessary to arrange a relatively thick layer of foam between the illuminating device and the skin.

The illuminating device being placed behind the layer of foam, this arrangement requires that the foam layer be translucent, which has the drawback of decreasing the quality and clearness of the image formed on the skin, and increasing the cost of the part.

One aim of the invention is therefore to obtain, at a lower cost, an interior vehicle equipment piece, agreeable to the touch, and having an assembly for displaying a light signal on the exterior surface of the skin with suitable quality and clearness.

To that end, the invention concerns a part of the aforementioned type, characterized in that the lighting device is flexible so that it deforms when touched, and is fastened on the interior surface of the skin, the skin covering the illuminating device, a region of the foam layer being inserted between the support frame and the illuminating device.

The piece according to the invention can comprise one or several of the following features, considered alone or according to all technically possible combinations:
- the illuminating device comprises a matrix display or segment screen;
- the illuminating device comprises a mask defining at least one pictogram and a light source capable of illuminating the pictogram of the mask;
- the flexible illuminating device has a thickness, considered perpendicular to a guiding surface of the skin, less than 50% of the thickness of the foam layer, considered perpendicular to a guiding surface of the skin;
- the flexible illuminating device is fastened on the interior surface of the skin via a flexible interface glue capable of deforming locally when the skin is locally deformed by touching to allow local movement of the illuminating device in relation to the opposite interior surface;
- the layer of foam is made in a single piece; and
- the frame and the foam layer comprise a peripheral region defining a cavity, the bottom of the cavity being at least partially defined by the illuminating device, the frame and the layer of foam comprising a central region with a shape substantially complementary to the cavity, the central region being removably attached on the peripheral region.

The invention also concerns a method for manufacturing a piece of motor vehicle interior equipment, of the type comprising the following steps:
- providing a rigid support frame and an external skin of soft appearance, at least partially translucent, the external skin having an exterior surface intended to be placed facing an occupant of the motor vehicle, and an interior surface;
- mounting an assembly for displaying at least one light signal on the exterior surface of the skin, the mounting comprising providing a device for illuminating, through the skin, from the interior surface of the skin, a chosen region of the exterior surface of the skin, the illuminating device being flexible so that it deforms when touched, and the fastening of the illuminating device, on the interior surface of the skin;
- placing a layer of foam between the support frame and the outer skin, a region of the foam layer being inserted between the support frame and the illuminating device.

The method according to the invention can comprise one or several of the following features, considered alone or according to all technically possible combinations:
- the placement step comprises:
  - introducing a foaming material into the interior volume defined between the interior surface of the skin and the frame, and
  - the expansion and hardening of the foaming material to form the foam layer;
- before the step for introducing the foaming material into the interior volume, the placement step comprises introducing a protrusion into the interior volume opposite the illuminating device, the frame and the foam layer defining, after hardening of the foaming material, a cavity in the space occupied by the protrusion during the foaming step, the placement step also comprising the provision of a central region of the foam layer and the frame with a shape substantially complementary to that of the cavity and the removable fastening of the central region in the cavity.

The invention will be better understood upon reading the following description, provided solely as an example, and done in reference to the appended drawings, in which.

In the rest of this document, the orientations are generally the usual orientations of a motor vehicle, thus the terms "upper," "lower," "top," "bottom," "left," "right," "front," and "back" refer to the normal direction of travel of the vehicle and the normal position of a driver.

The terms "interior" and "exterior" are used in relation to the position of the piece in the cab interior, the "exterior" being oriented toward an occupant of the vehicle located in the cab interior, and the "interior" being oriented away from that occupant.

Figure 1:
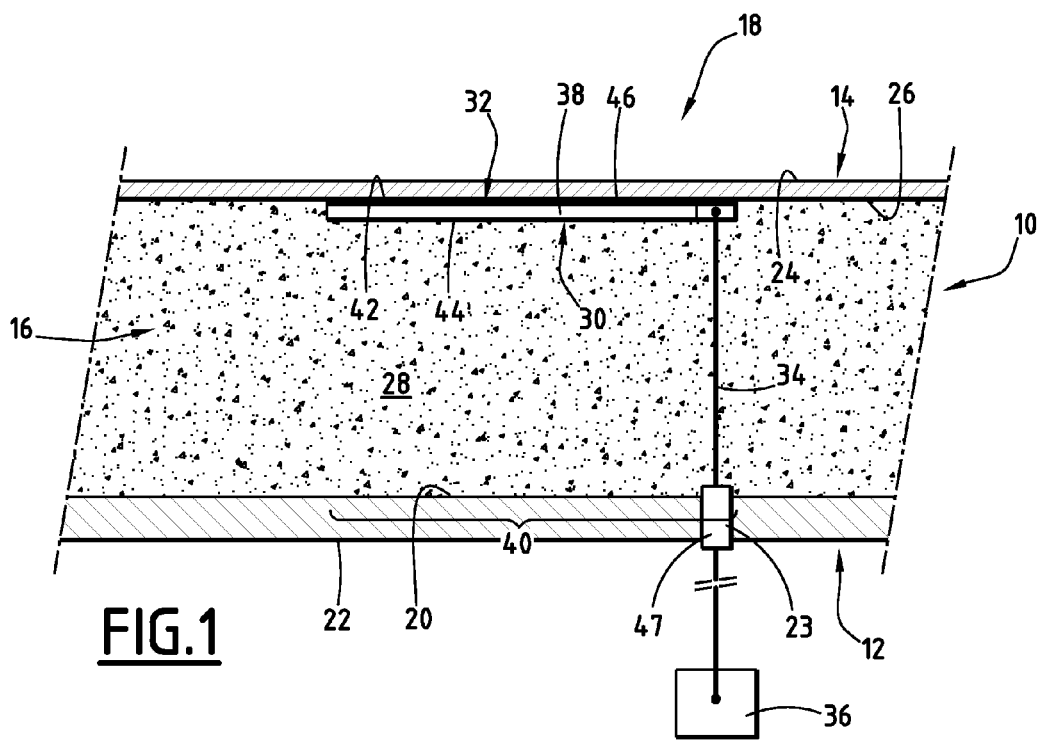
FIG. 1 is a partial cross-sectional view along a longitudinal vertical plane of a first interior piece of equipment according to the invention.
Figure 2:
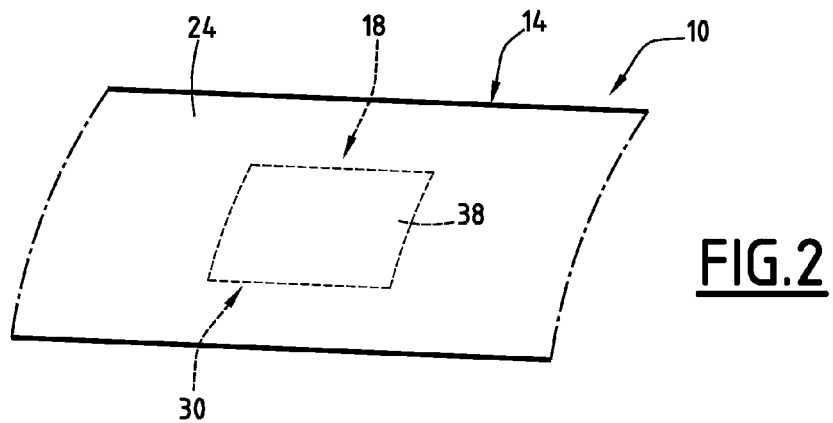
FIG. 2 is a three-quarters front perspective view of the piece of FIG. 1, the display assembly being in its deactivated configuration.
Figure 3:
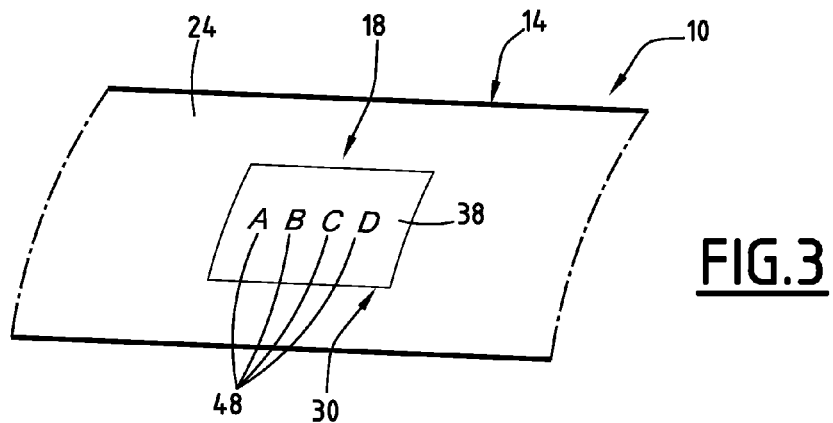
FIG. 3 is a view similar to FIG. 2 in an activated configuration of the display assembly.

A first interior piece 10 of motor vehicle equipment is shown in FIGS. 1 to 3. In this example, the piece 10 is a motor vehicle dashboard intended to be placed in the cab interior of the vehicle to support instruments.

Alternatively, the piece 10 is an interior trim piece such as, for example, a vehicle door, ceiling, or floor panel.

As illustrated in FIG. 1, the piece 10 comprises a rigid interior support frame 12, an external skin of soft appearance 14, and a foam layer 16 inserted between the support frame 12 and the exterior skin of appearance 14 to connect the frame 12 to the skin 14.

The piece 10 also comprises an assembly 18 for displaying at least one light signal on the skin 14.

The frame 12 is intended to be fastened on the body shell elements (not shown) of the vehicle. It is for example made of an olefin, homopolymer or copolymer thermoplastic material, possibly comprising mineral fillers or strengthening with glass fibers. It can be made of ABS-PC (acrylonitrile-butadiene-styrene and polycarbonate) possibly strengthened with glass fibers. These materials have a rigidity allowing them to serve a support function.

The frame 12 defines an exterior surface 20 on which the foam layer 16 is attached and an interior surface 22. The thickness of the frame 12, considered between the surface 20, 22, perpendicular to those surface is for example between 1 mm and 5 mm.

The frame 12 defines, opposite the display assembly 18, a passage opening 23 for electrically connecting the display assembly 18. This opening 23 emerges in the outer surface 20 and in the inner surface 22.

The external appearance skin 14 is intended to be placed opposite a user of the motor vehicle. It is for example made of elastomer thermoplastic such as polyurethane thermoplastic (PTU) or polyolefin thermoplastic (PTO). Advantageously, the skin 14 is made with a base of flexible vinyl polychloride (PVC), rubber or silicone.

The skin 14 has an external appearance surface 24 intended to be visible by a user of the motor vehicle and an interior surface 26 attached on the foam layer 16.

The thickness of the skin 14, considered between the exterior surface 24 and the interior surface 26, is for example between 1 mm and 20 mm.

According to the invention, the skin 14 can be deformed by touching, when a user's finger pushes on the exterior surface 24. Moreover, the skin 14 is translucent, such that the light transmission factor from the interior surface 26 to the exterior surface 24 is non-zero and less than 30%.

The interior surface 26 of the skin 14 and the exterior surface 20 of the frame 12 define, between them, an interior volume in which the foam layer 16 and at least part of the display assembly 18 are housed.

The foam layer 16 is for example made with an expanded polyurethane base. In the example illustrated in FIG. 1, the foam layer 16 extends continuously and in a single piece in the interior volume 28 between the exterior surface 20 of the frame and the interior surface 26 of the skin 14.

According to the invention, the display assembly 18 comprises a flexible illuminating device 30, intended to illuminate, through the skin 14, a chosen region of the exterior surface 24 from the interior surface 26.

The display assembly 18 also comprises means 32 for fastening the illuminating device 30 against the interior surface 26, at least one bundle 34 of wires for electrically connecting the illuminating device 30 extending through the foam layer 16 and through the opening 23, and means 36 for powering and controlling the illuminating device 30, arranged outside the interior volume 28 and electrically connected to the device 30 via the bundle of wires 34.

In the example illustrated in FIG. 1, the illuminating device 30 is formed by a matrix screen 38 comprising a plurality of pixels intended to be selectively illuminated. The screen 38 for example comprises a plurality of light-emitting diodes, advantageously organic light-emitting diodes designated by the acronym "OLED." Alternatively, the screen has light segments.

The screen 38 is flexible so that it can be deformed by touching when a user pushes on the exterior surface 24 of the skin 14 through the frame 12 opposite the screen 38.

The illuminating device 30 has a small thickness, less than 50% of the thickness of the foam layer 16 opposite the screen 38. Preferably, the thickness of the illuminating device is less than 10% of the thickness of the foam layer, in the region 40 of the foam layer located opposite the screen 38.

The screen 38 has an upper surface 42 fastened on the interior surface 26 of the skin 14 via fastening means 32 and an interior surface 44 fastened on the foam layer in the region 40 of that layer inserted between the illuminating device 30 and the support frame 12.

As will be seen later, the pixels of the matrix screen 38 are capable of illuminating the exterior surface 24 of the skin 14 by backlighting through the skin 14 from the interior surface 26 towards the exterior surface 24.

The fastening means 32 comprises a layer 46 of glue inserted between the interior surface 26 and the exterior surface 42. This glue is for example a translucent flexible polyurethane glue. The layer of glue 46 can be deformed at ambient temperature to allow a relative movement of the screen 38 in relation to the skin 14, by shearing along the surfaces 26, 42 when a user of the vehicle pushes on the exterior surface 24 of the skin 24. The deformable glue ensures homogeneity to the touch and prevents the skin 14 from being stiffened by the screen 38.

The bundle of wires 34 extends substantially perpendicularly to the screen 38 through the foam layer and through the opening 23 with insertion of a sealing device 46 in the opening 23.

The control means 36 are capable of electrically and selectively powering each pixel or segment of the screen 38 to cause it to be illuminated via the bundle of wires 34.

Thus, the display assembly 18 can be activated between an off, rest configuration, diagrammatically illustrated in FIG. 2, and an active illuminating configuration illustrated in FIG. 3.

In the rest configuration, none of the pixels of the screen 38 are illuminated. The skin 14 being only partially translucent, the illuminating device 30 is invisible from the exterior surface of the skin 24 that masks the illuminating device 30.

In the active configuration, illustrated in FIG. 3, pixels of the screen 18 have been activated and light chosen regions 48 of the exterior surface 24 from the exterior surface 26 through the layer of glue 46 and the skin 14.

It is thus possible to form a high quality and very clear image on the exterior surface 24 of the skin, given the small distance separating the illuminating screen 38 from the surface 24.

Moreover, in the absence of illumination, the exterior skin 14 has a continuous appearance from the cab interior of the vehicle and keeps a very agreeable feeling to the touch given the deformability of the illuminating device 30 and of the foam layer 28 located behind of the illuminating device 30.

Figure 4:
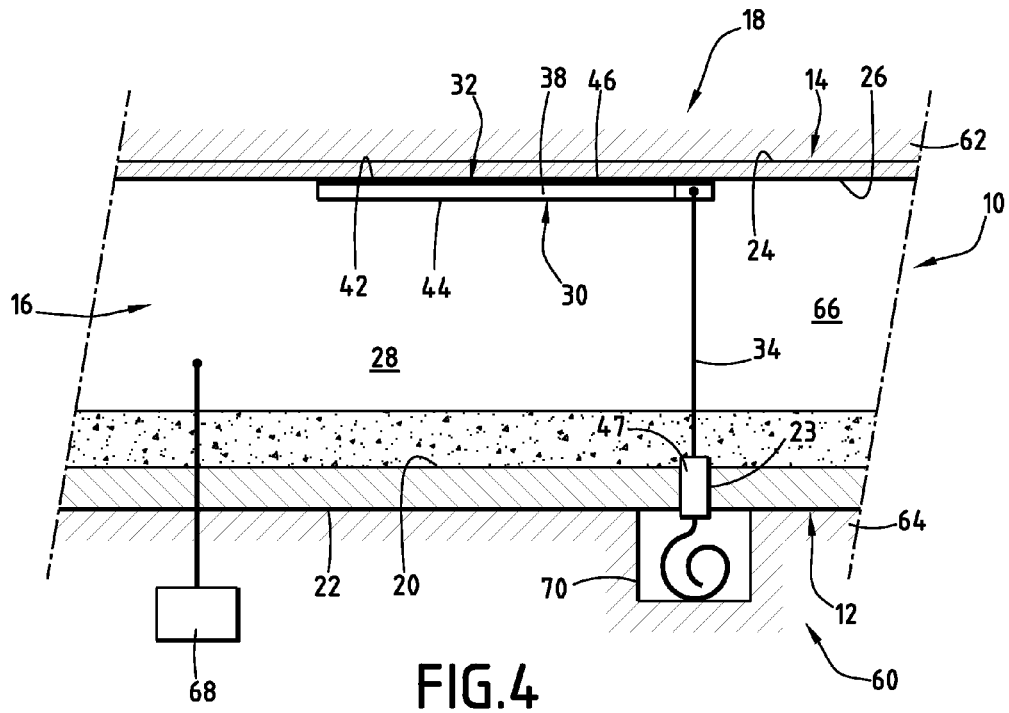
FIG. 4 is a cross-sectional view along a vertical plane of a mold for manufacturing the piece of FIG. 1, during manufacturing of said piece.

The first piece 10 according to the invention is manufactured in a foaming mold 60 partially and diagrammatically illustrated in FIG. 4.

This mold 60 comprises an upper half-mold 62 for supporting the skin and a lower half-mold 64 for supporting the frame, the upper half-mold 62 and the lower half-mold 64 defining a foaming cavity 66 between them.

The mold 60 also comprises means 68 for injecting a foaming material in the foaming cavity 66.

The method for manufacturing the first piece 10 according to the invention will now be described. Initially, this method comprises providing a frame 12 and an external appearance skin 14. The frame 12 is inserted in the mold 60 while being applied against the lower half-mold 64, while the skin 14 is inserted into the foaming cavity 66 by applying its exterior surface 24 against the upper half-mold 62.

The layer of glue 46 is then applied on the screen 38 and the screen 38 is fastened on the skin via the layer of glue 46. The bundle of wires 34 is then pulled into the empty volume 28 between the screen 38 and the orifice 23 with insertion of the sealing device 72, then outside the mold 60 in a housing 70 provided to that end.

In this configuration, the interior surface 26 of the skin and the exterior surface 20 of the frame 12 define, between them in the foaming cavity 66, the interior volume 28, which is substantially empty.

The injection means 68 is then activated to inject foaming material into the interior volume 28. The foaming material then undergoes an expansion to fill the entire interior volume 28 and connect the exterior surface 20 of the frame 12 to the interior surface 28 of the skin 14.

The hardening of the foaming material leads to the formation of the foam layer 16 that has a region 40 extending opposite the screen 38, between the frame 12 and the screen 38. This region 40 has a non-zero thickness substantially between 1 mm and 20 mm.

Figure 5:
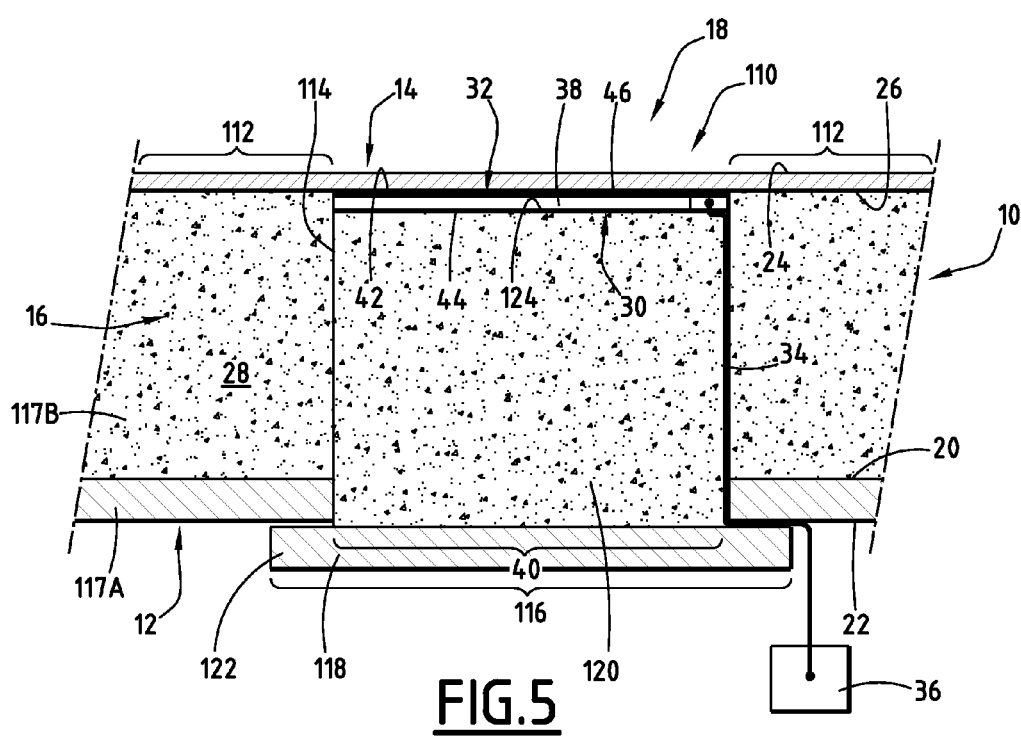
FIG. 5 is a view similar to FIG. 1 of a second piece according to the invention.
Figure 6:
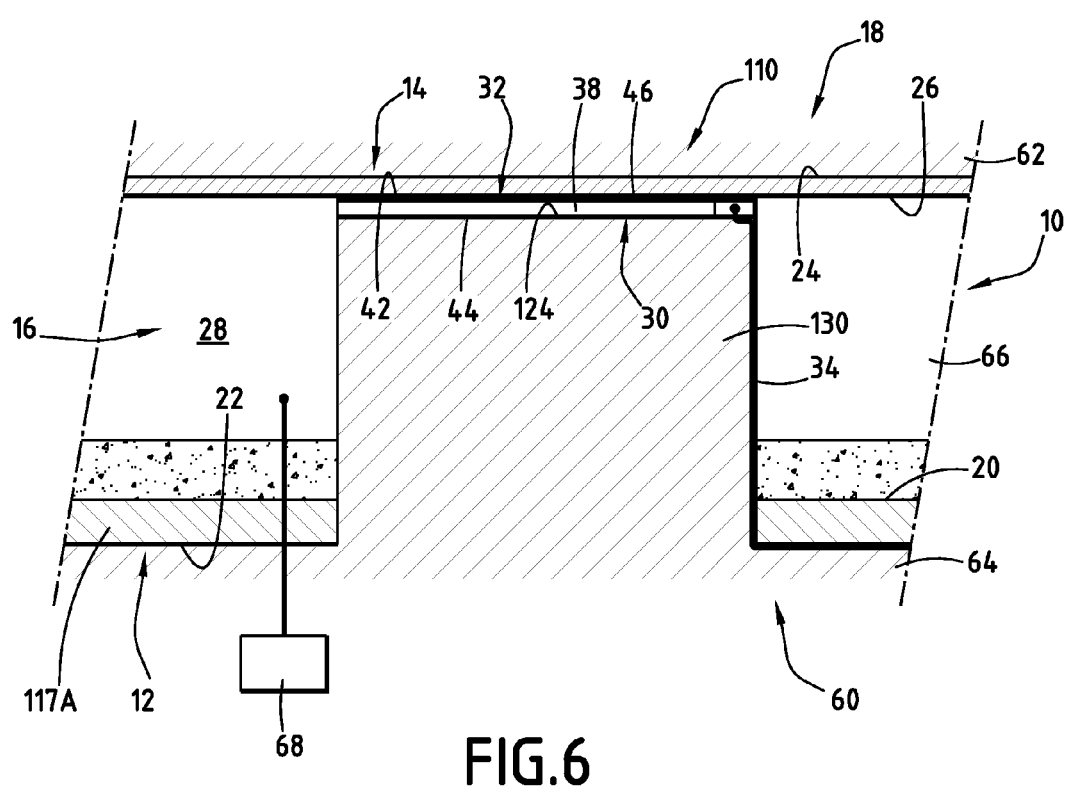
FIG. 6 is a view similar to FIG. 4 of the mold for manufacturing the second piece.
Figure 7:
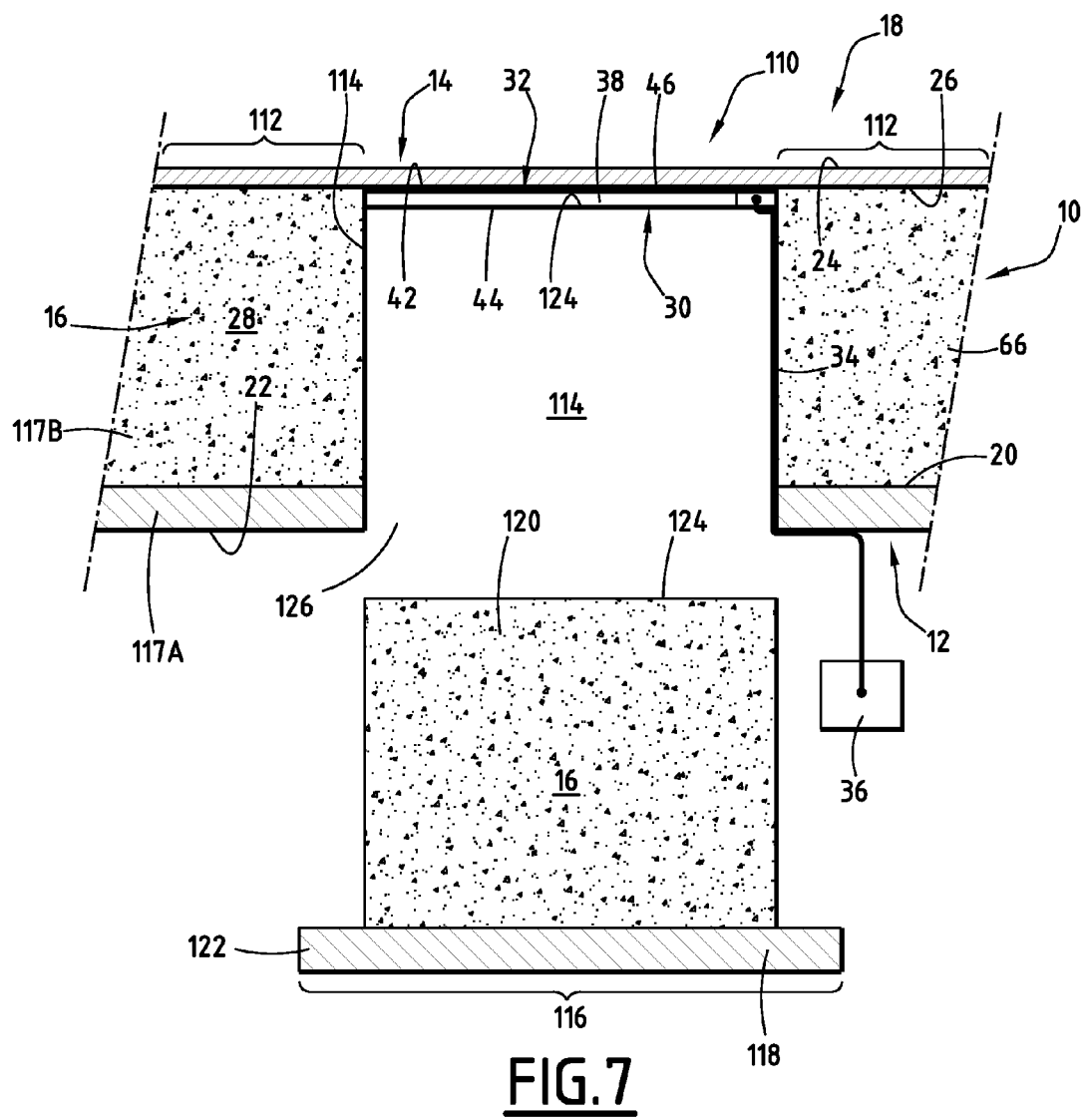
FIG. 7 is a view similar to FIG. 5 of the second piece, during repair of the illuminating assembly.

A second interior equipment piece 110 according to the invention is illustrated in FIGS. 5 to 7. Unlike the first piece, the frame 12 and the foam layer 16 form a peripheral region 112 defining a cavity 114 for accessing the illuminating device 32, and a central region 116 having a shape substantially complementary to the cavity 114, attached in the cavity 114.

The cavity 114 has a substantially constant section greater than or substantially equal to the horizontal section of the screen 38. It is defined by a peripheral wall formed from the outside towards the inside successively by the foam layer 16 and the frame 12. The cavity 114 emerges inwardly, opposite the skin 14. The bottom of the cavity 114 is defined by the screen 38.

The peripheral region 112 comprises a peripheral frame portion 117A and a peripheral foam portion 117B.

The central region 116 comprises a central frame portion 118, having a section larger than the section of the cavity 114, and a foam portion 120 having a section equal to that of the cavity 114 to substantially completely fill the cavity 114.

The central frame portion 118 defines a peripheral rim 122 intended to be applied against the peripheral frame portion 117A of the peripheral region 112.

The central foam portion 120 has an exterior surface 124 intended to be applied against the screen 38 as will be seen below.

The central region 116 is thus removably fastened on the peripheral region 112 between a mounted configuration, illustrated in FIG. 5, and a disassembled configuration, illustrated in FIG. 7.

In the mounted configuration illustrated in FIG. 5, the rim 122 is fastened on the peripheral frame portion 117A. The central foam portion 120 is inserted into the cavity 114 so that its upper surface 124 is applied against the screen 38. The bundle of wires 34 is inserted between the peripheral region 112 and the central region 116 along the interface between those regions.

In this configuration, the central foam portion 120 forms the region 40 of the foam layer inserted between the illuminating device 30 and the frame 12.

The foam layer 16 is then made in several portions 117B, 120 assembled together.

In the disassembled configuration illustrated in FIG. 7, the central region 116 has been removed from the cavity 114 and placed spaced apart from it. An operator can then access the screen 38 to repair it or disassemble it through the cavity 114 that emerges inwardly in the opening 126 defined by the peripheral frame portion 117A.

The mold 60 for manufacturing the second piece 110 differs from the mold 60 for manufacturing the first piece in that the half-mold 64 for supporting the frame comprises a protrusion 130 having a shape complementary to that of the cavity 114, intended to be applied against the screen 38 when the mold 60 is closed. Moreover, the mold 60 comprises a region (not shown) for forming the central region 116 comprising an additional foaming cavity, having a shape complementary to the central foam portion 120.

The method for manufacturing the second piece 110 differs from the method for manufacturing the first piece 10 in that the protrusion 130 is inserted in the foaming cavity 66 to prevent the expansion of the foaming material in the region occupied by the protrusion 130. Thus, during foaming, the foaming material undergoes an expansion around the protrusion 130 thereby forming the peripheral foam portion 117B and defining the foaming cavity 114 in the space freed by the protrusion 130 when the mold 60 is opened.

Furthermore, the central region 116 is formed in another portion of the mold. The method later comprises a step for inserting the central region 116 into the cavity 114, and a step for fastening the central region 116 on the peripheral region 112.

In one alternative (not shown), the illuminating device 30 comprises a mask applied on the interior surface 26 of the skin, the mask defining at least one pictogram, and a light source capable of illuminating the pictogram of the mask to create a light signal similar to the pictogram on the exterior surface 24.

The light source can be a flexible electroluminescent sheet or a fiber-optic network made of a flexible material (PMMA, PU).

The invention claimed is:
1. A piece (10; 110) of motor vehicle interior equipment, comprising:
a rigid support frame (12);
an external skin (14) of soft appearance, at least partially translucent, the external skin (14) having an exterior surface (24) intended to be placed facing an occupant of the motor vehicle, and an interior surface (26);

a layer of foam (16) inserted between the support frame (12) and the external skin (14);

an assembly (18) for displaying at least one light signal on the exterior surface (24) of the skin, the assembly (18) comprising at least one device (30) for illuminating, through the skin, from the interior surface (26) of the skin, a chosen region (48) of the exterior surface (24) of the skin, wherein the illuminating device (30) is flexible so that it deforms when touched, and is fastened on the interior surface (26) the skin, the skin (14) covering the illuminating device (30), a region (40) of the layer of foam (16) being inserted between the support frame (12) and the illuminating device (30).

2. The piece (10; 110) according to claim 1, wherein the illuminating device comprises a matrix display or segment screen (38).

3. The piece (10; 110) according to claim 2, wherein the illuminating device (30) comprises a mask defining at least one pictogram and a light source capable of illuminating the pictogram of the mask.

4. The piece (10; 110) according to claim 2, wherein the flexible illuminating device (30) has a thickness, considered perpendicular to a guiding surface (24) of the skin, less than 50% of a thickness of the layer of foam (16), considered perpendicular to a guiding surface (24) of the skin.

5. The piece (10; 110) according to claim 2, wherein the flexible illuminating device (30) is fastened on the interior surface (26) of the skin via a flexible interface glue capable of deforming locally when the skin (14) is locally deformed by touching to allow local movement of the illuminating device (30) in relation to the opposite interior surface (26).

6. The piece (10) according to claim 2, wherein the layer of foam (16) is made in a single piece.

7. The piece (110) according to claim 2, wherein the frame (12) and the layer of foam (16) comprise a peripheral region (112) defining a cavity (114), the bottom of the cavity (114) being at least partially defined by the illuminating device (30), the frame (12) and the layer of foam (16) comprising a central region (116) with a shape substantially complementary to the cavity (114), the central region (116) being removably attached on the peripheral region (112).

8. The piece (10; 110) according to claim 1, wherein the illuminating device (30) comprises a mask defining at least one pictogram and a light source capable of illuminating the pictogram of the mask.

9. The piece (10; 110) according to claim 1, wherein the flexible illuminating device (30) has a thickness, considered perpendicular to a guiding surface (24) of the skin, less than 50% of a thickness of the layer of foam (16), considered perpendicular to a guiding surface (24) of the skin.

10. The piece (10; 110) according to claim 1, wherein the flexible illuminating device (30) is fastened on the interior surface (26) of the skin via a flexible interface glue capable of deforming locally when the skin (14) is locally deformed by touching to allow local movement of the illuminating device (30) in relation to the interior surface (26).

11. The piece (10) according to claim 1, wherein the layer of foam (16) is made in a single piece.

12. The piece (110) according to claim 1, wherein the frame (12) and the layer of foam (16) comprise a peripheral region (112) defining a cavity (114), the bottom of the cavity (114) being at least partially defined by the illuminating device (30), the frame (12) and the layer of foam (16) comprising a central region (116) with a shape substantially complementary to the cavity (114), the central region (116) being removably attached on the peripheral region (112).

13. A method for manufacturing the piece (10; 110) of motor vehicle interior equipment according to claim 1, the method comprising:

providing the rigid support frame (12) and the external skin (14) of soft appearance, at least partially translucent, the external skin (14) having the exterior surface (24) intended to be placed facing an occupant of the motor vehicle, and the interior surface (26);

mounting the assembly (18) for displaying the at least one light signal on the exterior surface (24) of the skin, the mounting comprising providing the at least one device (30) for illuminating, through the skin, from the interior surface (26) of the skin, the chosen region (48) of the exterior surface (24) of the skin, the illuminating device (30) being flexible so that it deforms when touched, and the fastening of the illuminating device (30), on the interior surface of the skin (26);

placing the layer of foam (16) between the support frame (12) and the outer skin (14), the region (40) of the layer of foam (16) being inserted between the support frame (12) and the illuminating device (30).

14. The method according to claim 13, wherein the placement step comprises:

introducing a foaming material into the interior volume (28) defined between the interior surface (26) of the skin and the frame (12), and the expansion and hardening of the foaming material to form the layer of foam (16).

15. The method according to claim 14, wherein before the step for introducing the foaming material into the interior volume (28), the placement step comprises introducing a protrusion (130) into the interior volume (28) opposite the illuminating device (30), the frame (12) and the layer of foam (16) defining, after hardening of the foaming material, a cavity (114) in the space occupied by the protrusion (130) during the foaming step, the placement step also comprising the provision of a central region (116) of the layer of foam (16) and the frame (12) with a shape substantially complementary to that of the cavity (114) and the removable fastening of the central region (116) in the cavity (114).

* * * * *